United States Patent
Picklesimer

[15] 3,687,908
[45] Aug. 29, 1972

[54] POLYMERS CONTAINING NITRILE AND THIOAMIDE GROUPS AND THEIR PREPARATION

[72] Inventor: Lewellyn G. Picklesimer, Dayton, Ohio

[73] Assignee: The United States of America as represented by the Secretary of the United States Air Force

[22] Filed: Feb. 2, 1971

[21] Appl. No.: 112,021

[52] U.S. Cl. ............260/79.5 NV, 260/79.7, 260/778
[51] Int. Cl. ................................................C08f 27/06
[58] Field of Search.....260/79.5 R, 79.5 NV, 79.5 C, 260/778, 78.4 N, 88.7 B, 55 IS, 79.7

[56] References Cited

UNITED STATES PATENTS

| | | |
|---|---|---|
| 1,984,417 | 12/1934 | Mark..............................260/2 |
| 2,280,578 | 4/1942 | Hanford .....................260/551 |
| 2,563,640 | 8/1951 | Brown...................260/79.5 C |
| 2,563,662 | 8/1951 | Rothrock..............260/79.5 C |
| 2,891,932 | 6/1959 | Hankins...................260/80.73 |
| 2,893,908 | 7/1959 | Antlfinger ..................154/139 |
| 3,346,632 | 10/1967 | Tull ...........................260/551 |

*Primary Examiner*—Joseph L. Schofer
*Assistant Examiner*—C. A. Henderson, Jr.
*Attorney*—Harry A. Herbert, Jr. and Cedric H. Kuhn

[57] ABSTRACT

Novel polymers containing nitrile and thioamide groups are prepared by contacting a polymer of acrylonitrile or vinylidene cyanide with hydrogen sulfide at a temperature below about 50° C in the presence of a catalytic amount of an alkali metal carbonate. The polymers are useful as coatings and in the preparation of fibers and films.

12 Claims, No Drawings

POLYMERS CONTAINING NITRILE AND THIOAMIDE GROUPS AND THEIR PREPARATION

FIELD OF THE INVENTION

This invention relates to polymers that contain nitrile and thioamide groups. In one aspect it relates to a process for preparing such polymers.

BACKGROUND OF THE INVENTION

Polymers of acrylonitrile and vinylidene cyanide possess many properties which render them suitable for use as a textile fiber. However, the homopolymers, particularly polyacrylonitrile, are relatively insoluble in common solvents, a property that hinders fiber production. This undesirable property of polyacrylonitrile can be alleviated by using a copolymer prepared by copolymerizing acrylonitrile with an ethylenically unsaturated compound. While the introduction of comonomer units into the polymer chain has the desirable effect of increasing solubility, it causes difficulties in the conduct of the polymerization process itself. For example, since the monomers have different reactivity rates, sequential feeding of the monomers to the reaction zone may be required. For a more complete discussion of the difficulties encountered in the copolymerization process, reference is made to "Copolymerization" by Alfrey, Bohrer and Mark, Interscience Publishers, New York, N. Y., 1952.

It is an object of this invention, therefore, to provide a polymer containing nitrile and thioamide groups that is more soluble in common solvents than polyacrylonitrile or copolymers of acrylonitrile and an ethylenically unsaturated compound.

Another object of the invention is to provide a process for preparing a polymer containing nitrile and thioamide groups.

Other objects and advantages of the invention will become apparent to those skilled in the art upon consideration of the accompanying disclosure.

SUMMARY OF THE INVENTION

The present invention in one embodiment resides in a polymer comprising a plurality of recurring units having the following formula:

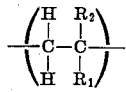

wherein $R_1$ is

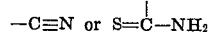

and $R_2$ is hydrogen,

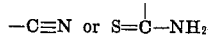

at least a portion of the $R_1$ and $R_2$ groups being

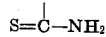

Broadly speaking, the polymers of this invention are prepared by contacting a polymer of acrylonitrile or a polymer of vinylidene cyanide with hydrogen sulfide. At least a portion of the nitrile groups of the polymeric starting materials react with the hydrogen sulfide to form thioamide groups, thus giving recurring units as depicted above.

When polyacrylonitrile is the starting material, the reaction that occurs can for purposes of illustration be represented by the following equation:

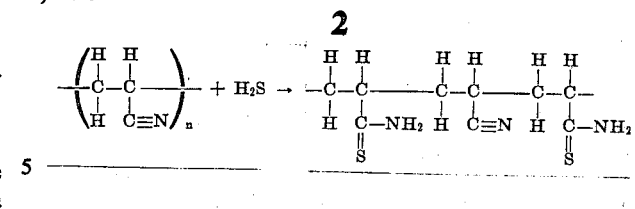

As shown in the above equation, n is equal to three and a mol of hydrogen sulfide has reacted with each of two nitrile groups to give a polymer containing one nitrile group and two thioamide groups. The product can also be described as containing two thioacrylamide and one acrylonitrile moieties or units.

The following equation represents for purposes of illustration the reaction that occurs when using a polymer of vinylidene cyanide as the starting material:

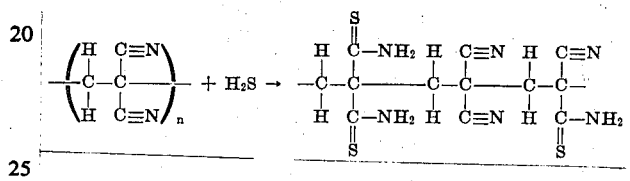

According to the above equation, $n$ is equal to three and a mol of hydrogen sulfide has reacted with each of three nitrile groups to give a polymer containing three nitrile groups and three thioamide groups.

The polymeric starting materials generally have a relatively high molecular weight so that $n$ in the formulas is usually a whole number in the range of about 500 to 3,000 and higher. The number of recurring units in the polymer product in general corresponds to those in the starting materials, i.e., in the range of about 500 to 3,000 and higher. In general, it is preferred to use as starting materials those polymers of acrylonitrile and of vinylidene cyanide which are recognized in the art as being fiber-formable polymers. Likewise the polymer products of this invention can be described as being fiber-formable polymers.

The terms "polymers of acrylonitrile" and "polymers of vinylidene cyanide" as used herein to designate the starting materials are intended to include homopolymers as well as copolymers of acrylonitrile and of vinylidene cyanide and an ethylenically unsaturated compound. Examples of suitable copolymerizable monomers include acrylic acid, methacrylic acid, acrylates, such as methyl acrylate, ethyl acrylate, butyl acrylate, methyl methacrylate, ethyl methacrylate, and butyl methacrylate, vinyl chloride, vinyl bromide, vinylidene chloride, vinyl carboxylates, such as vinyl acetate, vinyl chloracetate, and vinyl propionate, and the like. Generally, the copolymer contains at least 80 weight percent of acrylonitrile or vinylidene cyanide, e.g., from 80 to 98 weight percent acrylonitrile or vinylidene cyanide and 2 to 20 weight percent of the ethylenically unsaturated compound.

When a copolymer is used as the starting material, the comonomer units in the polymer chain remain unaffected as a result of the addition of the hydrogen sulfide. In other words, the polymer is employed as the starting material. This is illustrated by the following equation which shows the reaction that occurs when a copolymer of acrylonitrile and methyl methacrylate is the starting material:

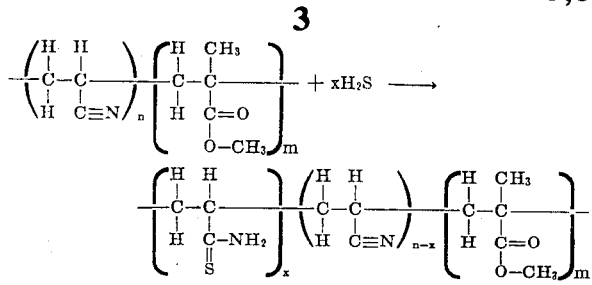 + xH₂S ⟶

As seen from the above equation, a copolymer having $n$ acrylonitrile and $m$ methyl methacrylate randomly distributed units is contacted with hydrogen sulfide. Furthermore, $x$ mols of hydrogen sulfide reacts with a like number of nitrile groups, giving $x$ number of thioacrylamide units and $n-x$ number of acrylonitrile units. The number $m$ of methyl methacrylate units remains unchanged. It is, of course, understood that the three different types of units are randomly distributed throughout the polymer chain.

From the foregoing discussion it is seen that when the starting material is a copolymer, the polymers of this invention can be specifically defined as comprising recurring units having the following formula:

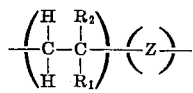

wherein $R_1$ is

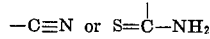

$R_2$ is hydrogen,

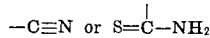

at least a portion of the $R_1$ and $R_2$ groups being

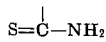

and Z is a randomly distributed moiety resulting from the polymerization of an ethylenically unsaturated compound. The Z moieties usually constitute about 2 to 20 weight percent of the polymer.

As previously mentioned, the process of this invention involves the contacting of a polymer of acrylonitrile or vinylidene cyanide with hydrogen sulfide. I a preferred embodiment the process comprises the step of contacting the polymer with hydrogen sulfide, the polymer being in solution in a solvent and the contacting occurring in the presence of an alkali metal carbonate catalyst at a temperature below about 50° C, e.g., between about 20 and 50° C.

Examples of suitable solvents that can be used include dimethylformamide, dimethylacetamide, and dimethylsulfoxide. In the practice of the process, the polymeric starting material is initially dissolved in the solvent so as to form a dilute solution. It has been found to be convenient to work with solutions containing about 5 to 10 weight percent polymer although higher concentrations can be used without adverse effects. The polymer solution is conveniently made up in a gas tight vessel fitted with a stirrer, an inlet for gaseous hydrogen sulfide, an outlet for unreacted hydrogen sulfide, and a thermometer well.

Hydrogen sulfide gas is bubbled slowly through the solution with vigorous stirring. It has been found that the addition of the hydrogen sulfide to the nitrile groups occurs rapidly and efficiently at atmospheric pressure and room temperature, i.e., at about 20° C. This was surprising because the conversion of simple nitriles to thioamides by hydrogen sulfide addition as taught by the prior art exemplified by U.S. Pat. Nos. 2,280,578 and 2,421,031 requires elevated temperatures and high pressures. It has also been found that in the present process, the temperature of the reaction mixture must not exceed about 50° C. If the temperature is permitted to rise above about 50° C, the polymer crosslinks, forming an insoluble mass.

The addition of hydrogen sulfide is usually continued for a period of from about ½ to 10 hours. However, the reaction period will generally depend upon the number of nitrile groups that it is desired to convert to thioamide groups. the higher the molecular weight of the polymeric starting material the longer the time required to convert the number of nitrile groups necessary to obtain a product of increased solubility. As an indication of when the polymer has attained a desired solubility, it has been found to be convenient to continue the addition of hydrogen sulfide until 1 milliliter of the polymer solution is completely miscible in 10 milliliters of acetone. The starting materials prior to hydrogen sulfide addition are insoluble in acetone. An indication of additional substitution of thioamide groups and a further increase in solubility may be obtained by continuing to add hydrogen sulfide until 1 milliliter of the polymer solution is completely miscible in methyl ethyl ketone, another non-solvent for the starting materials. While it is theoretically possible to convert all of the nitrile groups to thioamide groups, as a practical matter about 20 to 80 percent of the nitrile groups are usually converted. One mol of hydrogen sulfide is required for each nitrile group that is to be converted to a thioamide group. I actual practice it is usually preferred to add an excess amount of hydrogen sulfide, e.g., 1.25 to 1.75 mol per nitrile group to be converted. By operating with an excess of hydrogen sulfide, good contact between that material and the nitrile groups is assured, thereby hastening the addition.

After the addition of hydrogen sulfide is completed, the polymer product is recovered from solution by any suitable means, such as by precipitation. In a preferred method, the product is recovered by pouring the solution into water, thereby causing the polymer to precipitate from solution. The precipitated polymer can then be separated by filtration or decantation after which it is dried. It is often desirable to pour the polymer solution into water contained in a mixing vessel, such as a Waring blendor, so as to wash the product. The product is usually air dried initially with the drying being completed under vacuum at room temperature since it is somewhat hygroscopic.

While the process of this invention can be conducted in the absence of a catalyst, it is preferred to utilize such a material. Thus, it has been discovered that the addition of hydrogen sulfide to the nitrile group can be promoted by conducting the process in the presence of a catalytic amount of an alkali metal carbonate, such as sodium, potassium or lithium carbonate. As used, the catalyst is preferably in finely powdered form. Furthermore, it has been found that when dimethyl sulfoxide is used as the solvent, the use of a catalyst is necessary. Thus, in the absence of a catalyst, the dimethylsulfoxide reduces the hydrogen sulfide to sulfur and addition to the nitrile groups does not occur. The amount of catalyst used can vary within rather wide limits, e.g., from about 1 to 10 weight percent of the polymeric starting material. However, it is usually preferred to employ about 2 to 5 weight percent of the catalyst. In using the catalyst, it has been found to be advantageous to add it to the polymer solution several hours, e.g., from about 8 to 16 hours, prior to addition of the hydrogen sulfide.

A more complete understanding of the invention can be obtained by referring to the following illustrative examples which are not intended, however, to be unduly limitative of the invention.

EXAMPLE I

A run was carried out in which 300 grams of polyacrylonitrile was dissolved in 3,985 grams of dimethylformamide. This was accomplished by adding the polymer to a flask containing the solvent. The flask used in this and succeeding examples was fitted with a gas inlet, an outlet, an efficient stirrer and a thermometer. Hydrogen sulfide was bubbled through the polymer solution. During addition of the hydrogen sulfide, the solution was stirred rapidly to ensure thorough mixing of the materials. In this run and the runs described in the succeeding examples, the reaction temperature was maintained at below 35° C by cooling the flask with water. Addition of hydrogen sulfide was continued for a total of 10 hours before 1 ml. of the product solution was soluble in 10 ml. of acetone. Thereafter, the polymer solution was added to water in a Waring blendor thereby precipitating the polymer. The product was then separated and washed with running water after which it was died in air. A small sample was dried in a vacuum desiccator. The dried sample was then analyzed, and the following are the results of the elemental analysis:

|  | Weight percent |
|---|---|
| Carbon | 58.36 |
| Nitrogen | 21.44 |
| Sulfur | 10.66 |
| Hydrogen | 6.11 |

The foregoing analysis indicates that about 22 percent of the nitrile group of the polyacrylonitrile were converted thioamide groups.

EXAMPLE II

A polymer solution was prepared as in Example I, also employing 300 grams of polyacrylonitrile and 3,895 grams of dimethylformamide. Six grams of finely powdered sodium carbonate was added to the polymer solution. Since the sodium carbonate upon addition did not completely dissolve, the mixture was allowed to sit overnight. The next morning the addition of hydrogen sulfide was commenced. At the end of 4 hours, 1 ml. of the polymer solution was soluble in 10 ml. of acetone. The addition of hydrogen sulfide was continued for an additional 4 hours. The product was recovered and dried a in Example I. A sample of the product was analyzed with the following results:

|  | Weight percent |
|---|---|
| Carbon | 55.57 |
| Nitrogen | 21.19 |
| Sulfur | 12.86 |
| Hydrogen | 6.18 |

The foregoing analysis indicates that about 26 percent of the polyacrylonitrile were converted to thioamide groups.

EXAMPLE III

A polymer solution containing dissolved catalyst was prepared as in Example II, using 500 grams of polyacrylonitrile, 9,500 grams of dimethylformamide and 12.5 grams of sodium carbonate. Hydrogen sulfide was added for 8.5 hours before 1 ml. of the polymer solution was miscible with 10 ml. of acetone. After the product was recovered and dried, a sample was analyzed with the following results:

|  | Weight percent |
|---|---|
| Carbon | 62.57 |
| Nitrogen | 24.06 |
| Sulfur | 6.93 |
| Hydrogen | 5.81 |

The foregoing analysis indicates that about 13 percent of the nitrile groups of the polyacrylonitrile were converted to thioamide groups. This is about the lower limit of conversion at which the product is soluble in acetone.

EXAMPLE IV

A run was carried out in which 50 grams of polyacrylonitrile was dissolved in 950 grams of dimethylsulfoxide. Hydrogen sulfide was slowly bubbled through the solution while vigorously stirring. After 5 hours 1 ml. of the solution was only partially miscible in 10 ml. of acetone. The reaction flask was stoppered and allowed to stand overnight. The next morning it was observed that yellow crystals had separated out of the solution. Analysis of the crystals proved them to be sulfur. After sitting for 48 hours, the solution was still only partially miscible with acetone. The polymer product was recovered as in Example I, washed and dried. An analysis of the product indicated that it contained 1.44 weight percent sulfur.

EXAMPLE V run was conducted in which 50 grams of polyacrylonitrile was dissolved in 950 grams of dimethylsulfoxide. To the solution there was then added with stirring 2.5 grams of sodium carbonate. The addition of hydrogen sulfide was COMMENCED and after 1 hour 1 ml. of the solution was miscible with 10 ml. of acetone. After addition of hydrogen sulfide had been continued for one more hour, 1 ml. of the solution was miscible with 10 ml. of methyl ethyl ketone. The addition of hydrogen sulfide was continued for a total of 5 hours. Thereafter the polymer was recovered and dried as in Example I. A sample of the product was analyzed with the following results:

| | Weight percent |
|---|---|
| Carbon | 45.73 |
| Nitrogen | 17.42 |
| Sulfur | 27.51 |
| Hydrogen | 5.97 |

The foregoing analysis indicates that about 69 percent of the nitrile groups of the polyacrylonitrile were converted to thioamide group. An infrared spectra which was taken confirmed the presence of the thioamide groups.

EXAMPLE VI

A run was conducted in which 50 grams of polyacrylonitrile was dissolved in 950 grams of dimethylformamide. To the solution there was then added with stirring 2.5 grams of lithium carbonate. The addition of hydrogen sulfide was commenced and after about 2 hours 1 ml. of the solution was miscible with 10 ml. of acetone. After addition of hydrogen sulfide had been continued for one more hour, 1 ml. of the solution was miscible with 10 ml. of methyl ethyl ketone. The polymer product was recovered as in Example I, washed and dried. An analysis of the product gave the following results:

| | Weight percent |
|---|---|
| Carbon | 50.48 |
| Nitrogen | 19.61 |
| Sulfur | 22.71 |
| Hydrogen | 5.87 |

The foregoing analysis indicates that about 50 percent of the nitrile group of the polyacrylonitrile were converted to thioamide groups.

EXAMPLE VII

A run was conducted in which 50 grams of polyacrylonitrile was dissolved in 950 grams of dimethylformamide. To the solution there was then added with stirring 2.5 grams of potassium carbonate. The addition of hydrogen sulfide was commenced and after 45 minutes 1 ml. of the solution was miscible with 10 ml. of acetone. After addition of hydrogen sulfide had been continued for an additional 30 minutes, 1 ml. of the solution was miscible with 10 ml. of methyl ethyl ketone. The polymer product was recovered as in Example I, washed and dried.

EXAMPLE VIII

A run was carried out in which 996 grams of a copolymer of acrylonitrile and methylmethacrylate (90–10) was dissolved in 7,000 grams of dimethylformamide. To the solution there was then added with stirring 24.9 grams of sodium carbonate. The addition of hydrogen sulfide was then commenced. After about 3 hours 1 ml. of the solution was miscible with 10 ml. of acetone. About one-half of the solution was removed from the flask, and the polymer product was separated therefrom as in Example I, washed and dried. A sample of the product was analyzed with the following results:

| | Weight percent |
|---|---|
| Carbon | 59.06 |
| Nitrogen | 21.02 |
| Sulfur | 9.80 |
| Hydrogen | 6.03 |
| Oxygen | 4.32 |

The above analysis indicates that about 20 percent of the nitrile groups in the copolymer product were converted to thioamide groups.

The remainder of the solution in the flask was allowed to sit overnight. The next morning the addition of hydrogen sulfide was continued for a period of 5 hours. The polymer product was recovered as in Example I, washed and dried. A sample of the product was analyzed with the following results:

| | Weight percent |
|---|---|
| Carbon | 54.7 |
| Nitrogen | 19.47 |
| Sulfur | 16.43 |
| Hydrogen | 6.03 |
| Oxygen | 4.28 |

The above analysis indicates that about 37 percent of the nitrile groups in the copolymer product were converted to thioamide groups.

Polymers of acrylonitrile are insoluble in both acetone and methyl ethyl ketone. The runs described in the foregoing examples show that the polymers of this invention containing nitrile and thioamide groups are soluble in both of these materials. This property of the polymers renders them particularly useful in the preparation of fibers. Moreover, the polymer products of this invention can also be used in preparing coatings and films.

As will be evident to those skilled in the art, various modifications of this invention can be made in the light of the foregoing disclosure without departing from the spirit and scope of the invention.

I claim:

1. A polymer consisting essentially of a plurality of repeating units having the following formula:

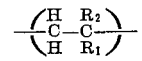

wherein $R_1$ is —C≡N or S=C—$NH_2$ and $R_2$ is hydrogen, —C≡N or S=C—$NH_2$, from about 20 to 80 percent of the $R_1$ ad $R_2$ groups being

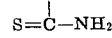

said polymer being soluble in acetone.

2. The polymer according to claim 1 in which $R_1$ is

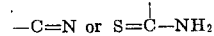

and $R_2$ is hydrogen.

3. The polymer according to claim 2 in which 20 to 80 percent of said $R_1$ groups are

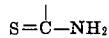

4. The polymer according to claim 1 which consisting essentially of a plurality of repeating units having the following formulas:

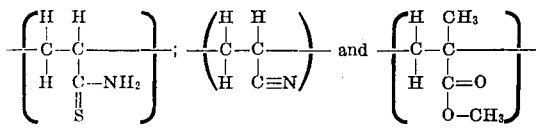

said repeating units being randomly distributed in the polymer.

5. The polymer according to claim 1 in which $R_1$ and $R_2$ are

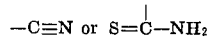

from about 20 to 80 percent of the $R_1$ and $R_2$ groups being

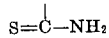

6. A process for preparing a polymer having nitrile and thioamide groups which comprises the steps of contacting with hydrogen sulfide gas a polymer having nitrile groups selected from the group consisting of polymers of acrylonitrile and polymers of vinylidene cyanide, said polymers being in solution in a solvent selected from the group consisting of dimethylformamide, dimethylacetamide and dimethylsulfoxide and said contacting occurring in the presence of a catalytic amount of an alkali metal carbonate at a temperature below about 50° C.; and continuing said contacting until about 20 to 80 percent of the nitrile groups are converted to thioamide groups.

7. The process according to claim 6 in which said polymer is a polymer of acrylonitrile.

8. The process according to claim 6 in which said polymer is a copolymer of acrylonitrile and methylmethacrylate.

9. The process according to claim 6 in which said polymer is a polymer of vinylidene cyanide.

10. The process according to claim 6 in which said polymer is dissolved in said solvent, said catalyst is added to the resulting solution, said hydrogen sulfide is bubbled through said solution for a period of from about one half to 10 hours, and said polymer having nitrile and thioamide groups is recovered from said solution.

11. The process according to claim 10 in which said polymer having nitrile and thioamide groups is recovered by contacting said solution with water, thereby precipitating said polymer.

12. The process according to claim 6 in which said catalyst is sodium, potassium or lithium carbonate and the amount of catalyst used is about 1 to 10 weight percent of said polymer.

* * * * *